(12) United States Patent
Palti

(10) Patent No.: US 6,220,750 B1
(45) Date of Patent: Apr. 24, 2001

(54) NON-INVASIVE TEMPERATURE MEASUREMENT METHOD AND APPARATUS

(76) Inventor: Yoram Palti, 55 Ruth Street, 34404 Haifa (IL)

( * ) Notice: Subject to any disclaimer, the term of this patent is extended or adjusted under 35 U.S.C. 154(b) by 0 days.

(21) Appl. No.: 09/280,613

(22) Filed: Mar. 29, 1999

(51) Int. Cl.$^7$ .................. G01K 7/02; A61B 6/00
(52) U.S. Cl. ............................... 374/164; 600/475
(58) Field of Search .................. 374/112, 164, 374/179, 208, 163, 166, 170, 174; 600/473, 474, 475

(56) References Cited

U.S. PATENT DOCUMENTS

| | | | |
|---|---|---|---|
| 3,702,076 | 11/1972 | Georgi | 73/362 |
| 3,926,053 | 12/1975 | Schurrer | 73/357 |
| 3,942,123 | 3/1976 | Georgi | 328/1 |
| 4,347,854 * | 9/1982 | Gosline et al. | 374/166 |
| 4,437,471 * | 3/1984 | Nelson | 374/162 |
| 4,725,399 * | 2/1988 | McCulloch et al. | 374/208 |
| 4,747,413 * | 5/1988 | Bloch | 374/163 |
| 4,859,081 * | 8/1989 | Kabayashi | 374/208 |
| 5,172,979 * | 12/1992 | Barkley et al. | 374/147 |
| 5,174,656 * | 12/1992 | Dotan | 374/179 |
| 5,176,451 * | 1/1993 | Sasada et al. | 374/208 |
| 5,993,061 * | 11/1999 | Drouet | 374/208 |
| 6,059,452 * | 5/2000 | Smith et al. | 374/162 |

FOREIGN PATENT DOCUMENTS

| | | | |
|---|---|---|---|
| 2305720 * | 10/1976 | (FR) | 374/164 |
| 0021883 * | 2/1977 | (JP) | 374/164 |
| 61-120026 * | 6/1986 | (JP) | 374/163 |

\* cited by examiner

*Primary Examiner*—G. Bradley Bennett
*Assistant Examiner*—Gail Verbitsky

(57) ABSTRACT

A method of measuring the temperature of the core of a body includes: a) providing a heat conductive space outside the body and in contact with its surface; b) monitoring the difference of the temperatures of two points located within the space and at different distances from the body surface; c) if the temperature difference indicates that heat is flowing from the body surface outwards, generating heat in the space in order to reduce the temperature difference; d) monitoring the temperature difference; and e) assuming the temperature of one of the two points, when the temperature difference is zero, as the temperature of body core.

24 Claims, 6 Drawing Sheets

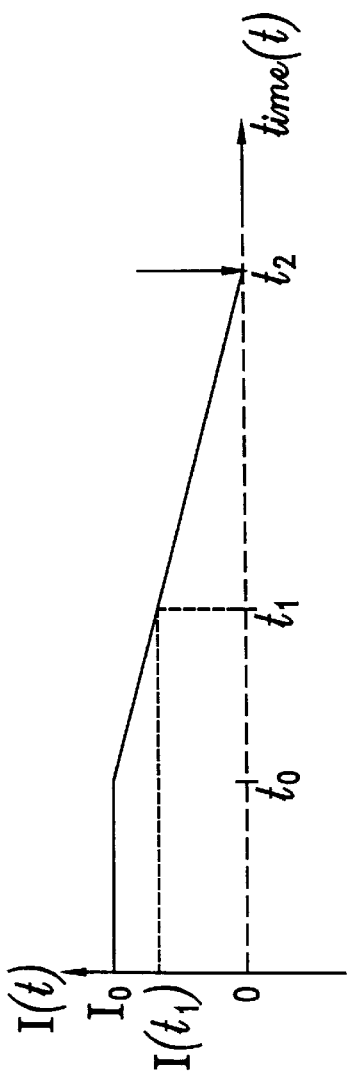
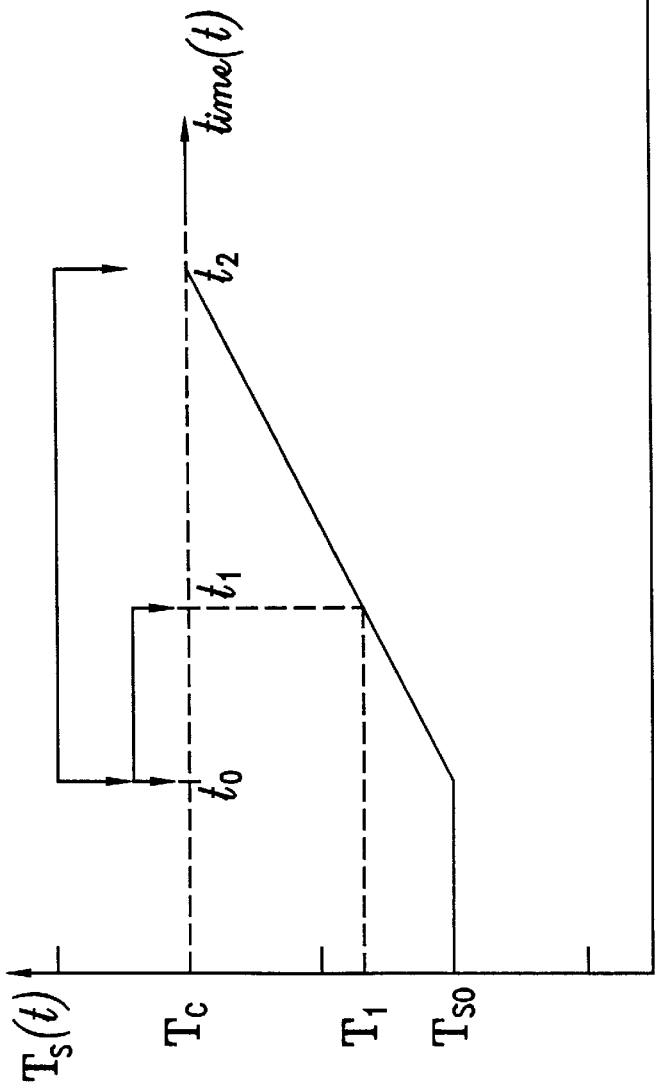

NON-INVASIVE TEMPERATURE MEASUREMENT METHOD AND APPARATUS

FIELD OF THE INVENTION

The present invention relates to temperature measurement. More particularly, the invention relates to a method and apparatus for the accurate measurement of the core temperature of a body by sensing the temperature at points outside the body.

BACKGROUND OF THE INVENTION

Temperature measurements are widespread and essential in many fields of modern life, such as industry, science, medical care and many other basic human needs. A lot of processes in industry are temperature controlled or strongly affected by temperature. Therefore, accurate temperature measurements are required for carrying them out properly. The same requirements apply also in science, when experimentation and research often require temperature sensing. Human body temperature measurements are mandatory in many cases. Accurate measurement of human body temperature is carried out as a routine in hospitals and clinics and is generally required for medical care in view of its symptomatic significance.

Mercury thermometers are used frequently for measuring the temperature of the human body orally, in the axilla or rectally. However, in spite of the fact that such measurements are in themselves accurate, they often poorly reflect the inner temperature of the human body, since there is a substantial difference between said temperature and that of the sensed area and, further, the temperature that is read depends of the way the thermometer tip is held in the measurement. Another reason for inaccuracy is associated with different modes of operation of the thermometer. For instance, if the patient is a child, using the thermometer orally, the heat conduction from his mouth to the thermometer may vary according to the orientation of the tip in the child's mouth and the fact that he opens it from time to time. Another disadvantage of the mercury thermometer is its fragility. In addition, it should be sterilized after each use.

Oral and rectal measurements are also inconvenient for the patient, and in some cases may even be painful. Surface or external measurements, such as by thermometers attached to the skin, are less inconvenient but even less accurate. Optimally, these thermometers measure the skin temperature, which may substantially differ from the relevant inner body temperature by as much as 10° C. and even more, if the contact with the skin is poor. Thermal conduction and heat flow affect surface temperature measurements. For example, the human body is not well insulated from the ambient and there is a constant heat flow from the skin to the ambient and from the body core to the skin. Thus, under normal conditions, the skin temperature is always colder than the core temperature to be measured. In addition, thermal conduction between the skin and the thermometer is affected by several factors, such as adhesion and skin humidity. Additionally, heat is lost by the thermometer to the ambient in an amount depending on the insulation of the thermometer.

Another disadvantage associated with conventional thermometers is the time required to take a temperature. At least a minimum time, which may be more than three minutes, is needed for a reasonable measurement accuracy. Some patients, for instance children, do not stand such relatively lengthy measurements. Further, in hospitals, reading the temperature of each patient several times a day requires an unacceptable part of the nurse's duty time.

Other thermometers use an Infra-Red technology, thereby reducing the measurement time. Temperature is read by inserting the sensor into the ear channel measuring the amount of the IR radiation emitted from the channel, and converting it to temperature values. Still, this measurement is relatively expensive, and often does not correlate well with the body temperature.

U.S. Pat. No. 3,702,076 discloses an electronic thermometer, which provides a temperature measurement output as a direct digital, display. U.S. Pat. No. 3,942,123 describes an electronic thermometer based on an electrical bridge with a thermistor in one arm of the bridge. A shunting impedance is switched into and out of the balancing arm of the bridge in a manner providing indication about the measured temperature, according to the thermistor resistance value. U.S. Pat. No. 3,926,053 describes an apparatus of non-contact surface temperature determination on a rotating part, which comprises a sensing probe unit for temperature and distance detection and a capacitive excursion measurement system. However, each apparatus described in said patents provides only indications about the surface temperature, and still lacks the core temperature measurement capability.

It is an object of the present invention to provide a method and an apparatus for accurate measurements of body core temperatures, which overcome the drawbacks of prior art methods and devices.

It is another object of the invention to provide a non-invasive method and apparatus, which permit the accurate estimation of body core temperature from temperature measurements external to the body.

It is a further object of the invention to provide a method and apparatus for the estimation of body core temperatures, which permit to reduce the time required for the measurement without significant loss of accuracy.

It is a still further object of the invention to provide a method and apparatus which achieve the aforesaid objects in the measurement of the human body temperature without causing discomfort to the patient.

Other purposes and advantages of the invention will appear as the description proceeds.

SUMMARY OF THE INVENTION

In describing the invention, it will be assumed that the body, the temperature of which is to be measured, has an inner portion the temperature of which is substantially constant (hereinafter called "the body core" or "the core"), a surface, from which heat is dissipated into the surrounding ambient, and a layer between the core and the surface (which may be called "subsurface layer") wherein the temperature gradually decreases from that of the core to that of the surface. In the case of a steady heat flow and a constant conductivity throughout the subsurface layer, said temperature decrease is linear. It is assumed that since there are no heat sources in the body except the core, the temperature falls as a monotonous decreasing function from the core to the surface. Under these conditions, in steady state, if it is found that two intermediate points along a path between two extreme points have the same temperature, the two extreme points must be at the same temperature. This invention is based on the concept that, if a path for heat flow can be created between the core of the body, the temperature of which is to be measured (hereinafter, briefly "the body"), and points outside said body, and the flow of heat along this path can be controlled so that two points of said path are at the same temperature, under thermal equilibrium, this indicates that heat flow has ceased and their temperature will be the same as that of the core.

This invention therefore provides a method of measuring the temperature of the core of a body, which comprises:

a) providing a heat conductive space outside the body and in contact with its surface;

b) monitoring the difference of the temperatures of two points located within said space and at different distances from said body surface;

c) if said temperature difference indicates that heat is flowing from the body surface outwards, generating heat in said space, whereby to reduce said temperature difference; and d) monitoring said temperature difference, and assuming the temperature of one of said two points, when said temperature difference is zero, as the temperature of body core.

Preferably, said body core temperature is displayed.

In one variant of the invention, the generation of heat in the heat conductive space is continued until the temperature of said two points located within said space has been equalized and the temperature of one of said two points, preferably the one nearer the body surface, is measured. In another variant of the invention, which accelerates the temperature measurement process, heating of the heat conductive space is discontinued before the temperatures of the aforesaid two points have been equalized, and the temperature which one of said points would have assumed if it had been equalized is calculated by extrapolation. The moment in which the temperature difference between said two points becomes zero or would become zero, will be called "the zero moment".

In order that the assumption that the method of the invention should yield sufficiently accurate result, a quasi-thermal steady state condition must have been reached. This means that at the zero moment the temperature is substantially constant along a path from the body core to said two points within the heat conductive space, and therefore the body core, the body surface and said points are at the same temperature. This is true, in spite of the fact that heat will continue to flow from the body core to the body surface and from this latter to the ambient along paths that do not pass through the heat conductive space and the temperature will not be constant along said paths. However, if the heat is transmitted too rapidly before equilibrium is reached, the thermometer reading may not be sufficiently accurate. Care should be taken therefore to apply the appropriate power to the heater, which can be determined, if necessary, by a calibration of each type and size of thermometer according to the invention. From the thermodynamical viewpoint, the slower the heating, the more accurate the temperature reading. Therefore, in order to obtain a precise measurement without requiring too long a time, it is possible to divide the temperature measurement process into two stages: in the first stage the heating is fast and its zero moment provides a first, approximate temperature reading, and in the second stage the heating is slow and said approximate reading is corrected to reach a new zero moment providing the final, accurate reading. Both stages are short, because in the first the heating is fast and in the second, while the heating is slow, only a small correction of the temperature reading is effected.

The heat conductive space should be thermally insulated on all its surfaces, except where it is intended to contact the surface of the body.

Correspondingly, this invention provides an apparatus for measuring the temperature of the core of a body, which comprises:

I—an element (which is a sensing unit and will be hereinafter called "capsule), the inside of which is heat conductive, preferably with a high heat conductivity and a low heat capacity, which has a surface adapted to be placed in contact with the surface of the body the temperature if which is to be measured and is thermally insulated on all its other surfaces;

II—a heating element for heating the inside of the capsule;

III—two temperature sensors for measuring the temperatures of two points inside the capsule and/or the difference of said temperatures IV—a control module, including a power supply; and V—a connection between the capsule and the control module.

Preferably, the apparatus further comprises a display, which can be e.g. a liquid crystal or a light emitting diode display.

Preferably, the temperature sensors are thermocouples.

Hereinafter, the term "capsule" will be used to designate both the element the inside of which is heat conductive and the heat conductive space defined by said element.

The control module comprises a power source for activating the heating element, a temperature measurement circuit connected to the thermocouples, a temperature display, and a controller, which might be e.g. an ASIC, receiving input from the thermocouples and correspondingly controlling the activation of the heater in an on-off or proportional manner. Preferably, the temperature measurement circuit has two functional modes: measuring the difference of the temperatures of the aforesaid two points inside the capsule, or measuring the temperature of one of said points.

The aforesaid two points are at different distances from the capsule surface adapted to be placed in contact with the surface of the body, and preferably located close to said surface and more preferably at or near a perpendicular to said surface.

The surface of the capsule that is to be placed in contact with the surface of the body will be adapted to said surface and to the nature of the body. If the apparatus is used to measure the temperature of the human body, it can be rendered a heat conductive adhesive so that it may be held firmly on the skin.

The connection between the capsule and the CM can be established by providing a first interface on the capsule and a second interface on the module and operatively connecting the interfaces by means of conductors, when required. Such connections are in themselves conventional and need not be particularly described. Alternatively, capsule and CM may be permanently connected, or form a unitary structure.

BRIEF DESCRIPTION OF THE DRAWINGS

In the drawings:

FIG. 5A is a diagram illustrating the variation of the difference of the temperature of the two thermocouples housed in the capsule as a function of time;

FIG. 5B is a diagram illustrating the variation of the body surface temperature as a function of time;

DETAILED DESCRIPTION OF PREFERRED EMBODIMENTS

The embodiments that will be described are thermometers for measuring the temperature of the human body. This, however, should not be construed as a limitation, as the invention can be applied advantageously to other temperature measurements, particularly in industry and in science.

Figure 1:
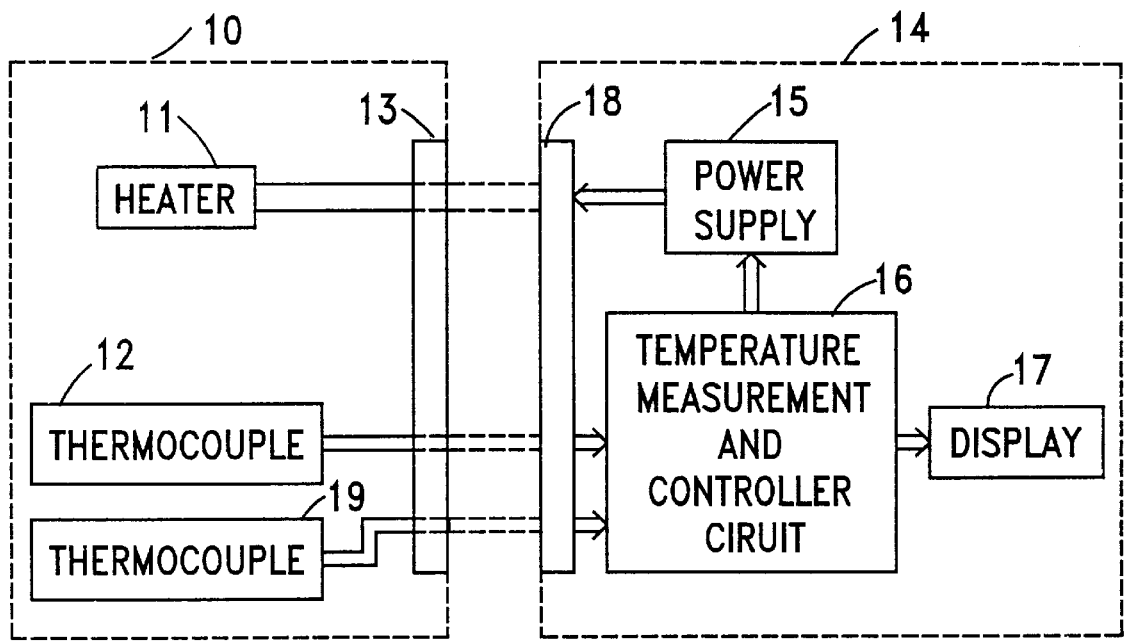
FIG. 1 is a block diagram of a thermometer, according to one preferred embodiment of the invention.

FIG. 1 is a block diagram of a non-invasive thermometer, according to one preferred embodiment of the invention, which is adapted to be attached to the surface of a body and to measure the core temperature. A sensing unit or capsule 10, to be placed in contact to the body surface and retained thereon, contains, within a body having high thermal conductivity and low thermal capacity and provided with a thermally insulated cover, not indicated in the diagram, an electrical heater 11, two thermocouple elements, 12 and 19, and an interface connector 13 for operatively connecting it with the Control Module. A Control Module (CM) 14 contains a power supply 15, a temperature measurement and control circuit 16 connected to the thermocouples, a temperature display 17, and an interface connector 18.

As used herein, the terms "measurement" and "measuring" are meant to include indirect measurement, i.e., the estimation of the temperature of a body core from temperatures measured outside said body.

According to one preferred embodiment of the method of the invention, temperature measurement is started by applying the capsule to the surface of the body, the temperature of which is to be measured, and connecting the capsule to the CM through connectors 13 and 18. Thermocouple junction 12 "senses" the temperature at one point in the capsule and thermocouple junction 19 "senses" the temperature at another point in the capsule, the two junctions being at different distances from the capsule surface that is intended to be applied to the body surface. Though thermocouples are described in this embodiment, other temperature sensors adapted to sense the temperature of points inside the capsule could be used.

Figure 7:
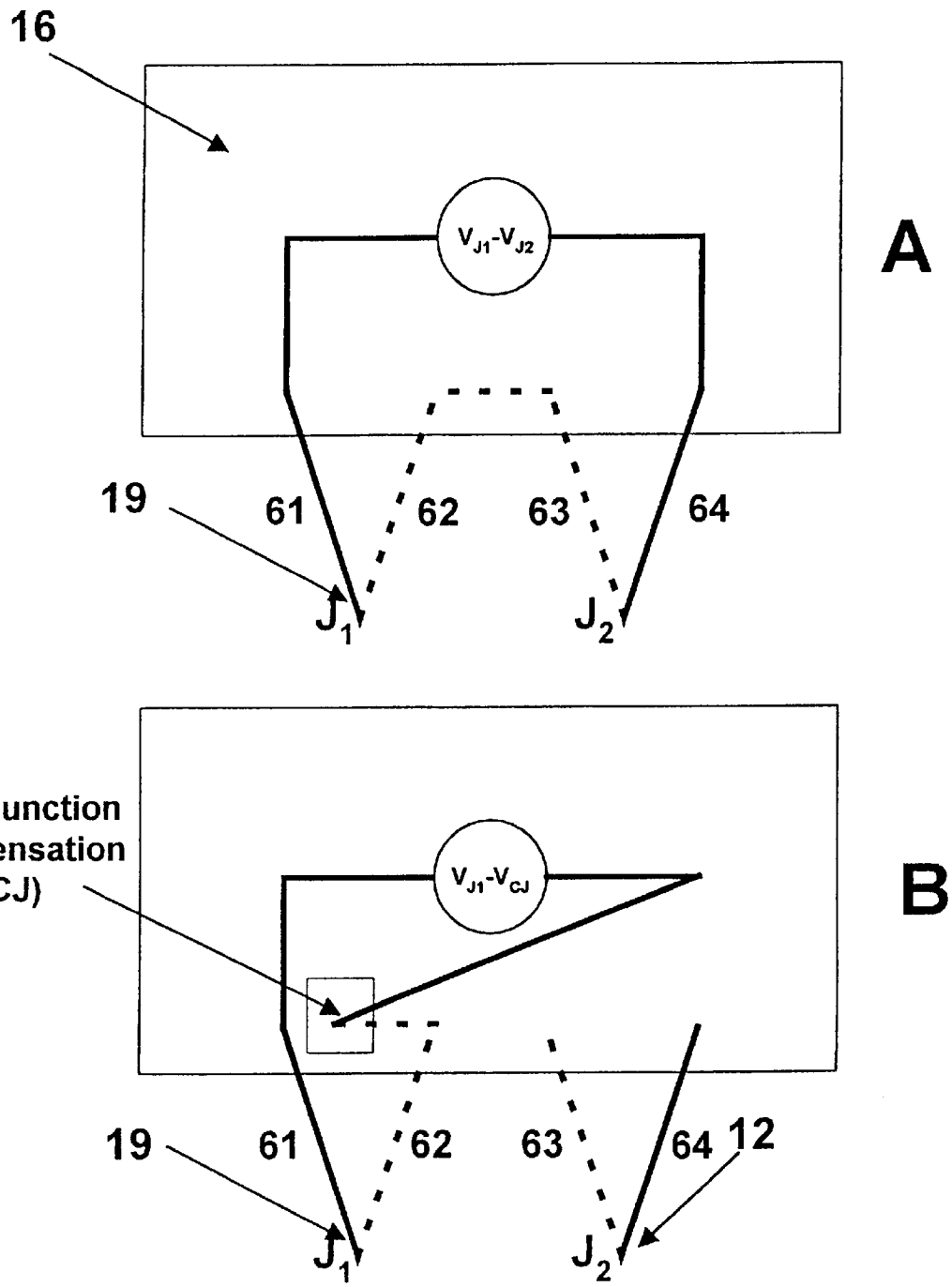
FIGS. 7A and 7B schematically illustrates the temperature measurement process, according to an embodiment of the invention.

The temperature measurement process is schematically illustrated in FIGS. 7A and B, wherein the two junctions of the thermocouples 12 and 19 are indicated as $J_1$ and $J_2$ respectively. FIG. 7A shows the two junctions $J_1$ and $J_2$, shortened by wires 62–63. The voltage difference generated between the two thermocouple junctions is fed, via the connectors, into the CM 14, which amplifies and reads the difference $V_{J1}-V_{J2}$ between the two voltages, corresponding to the temperature difference between the two junctions $J_1$ and $J_2$. If said voltage difference indicates that heat is flowing from the surface of the body, and therefore from its core, to the capsule, i.e. $t_{19}>t_{12}$, the temperature measurement and controller circuit connects the power supply 15 to the heater 11. As a result, the body heats and the temperatures of junctions 12 and 19 rise, but that $t_{12}$ increases more than $t_{19}$, as the first is closer to the heater, and the difference between them is reduced. When said temperature difference, and therefore said voltage difference, has become zero, the situation becomes that illustrated in FIG. 7B. The measurement and control circuitry 16 reads the temperature at one thermocouple junction (usually at the junction which is closer to the body surface), which, in FIG. 7B is assumed to be junction $J_1$, by measuring the voltage difference between it and a reference point. The reference point, at this stage, is no longer the second thermocouple, but a cold junction compensation CJ, which is a junction at a known reference temperature ($V_{CJ}$), or, preferably, an electronic unit that carries out the same function, such as are well known to expert persons. The measured voltage difference is therefore $V_{J1}-V_{CJ}$. The measurement and control circuitry 16 displays the reading on display 17 and disconnects the power supply 15 from the heater 11. Alternatively, for continuous measurements, the control 16 does not shut off the heater, but only reduces its power, so that a predetermined, small temperature difference remains. The display may be of any suitable type known in the art and therefore need not be described.

According to another embodiment of the invention, the temperature of the body core may be read, with slightly lower accuracy, as the aforesaid voltage difference approaches zero, i.e., when it has become lower than a small predetermined value; or it may estimated by extrapolation, as more fully explained hereinafter.

Figure 2:
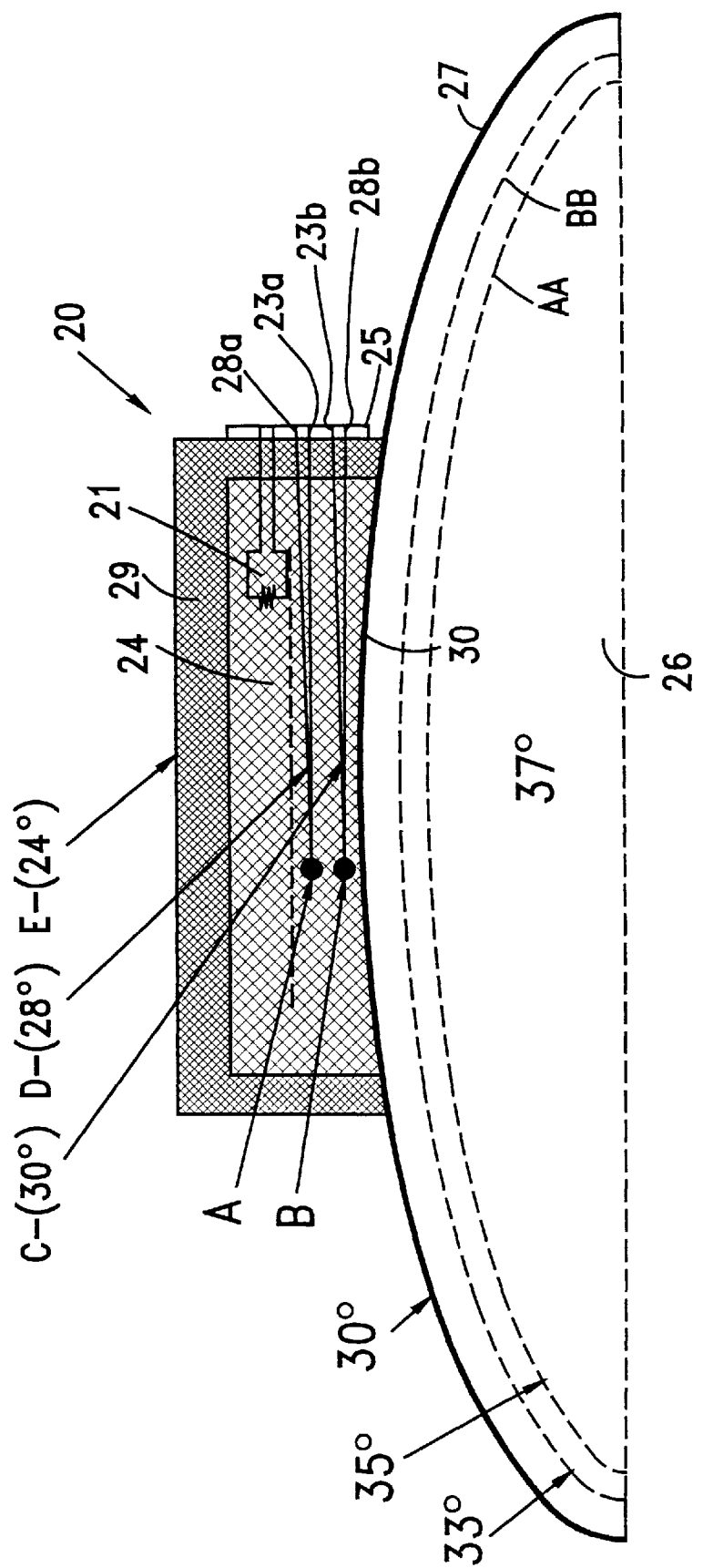
FIG. 2 is a cross-section of the capsule of the thermometer, according to one preferred embodiment of the invention.

FIG. 2 is a cross-section of a capsule generally indicated at 20, attached to the surface 27 of a human body 26, according to a preferred embodiment of the invention. The capsule 20 contains a heater 21, two thermocouple junctions and a heat conducting material 24. The first thermocouple junction consists of wires 23a and 28a, is located at point "A". The second thermocouple junction, consists of wires 23b and 28b, is located at point "B". An interface connector 25, attached to the capsule, comprises contacts carrying data from the two thermocouple junctions, and additional electric contacts for supplying heating power to the heater 21 (which may be, for instance, a resistor).

Figure 3:
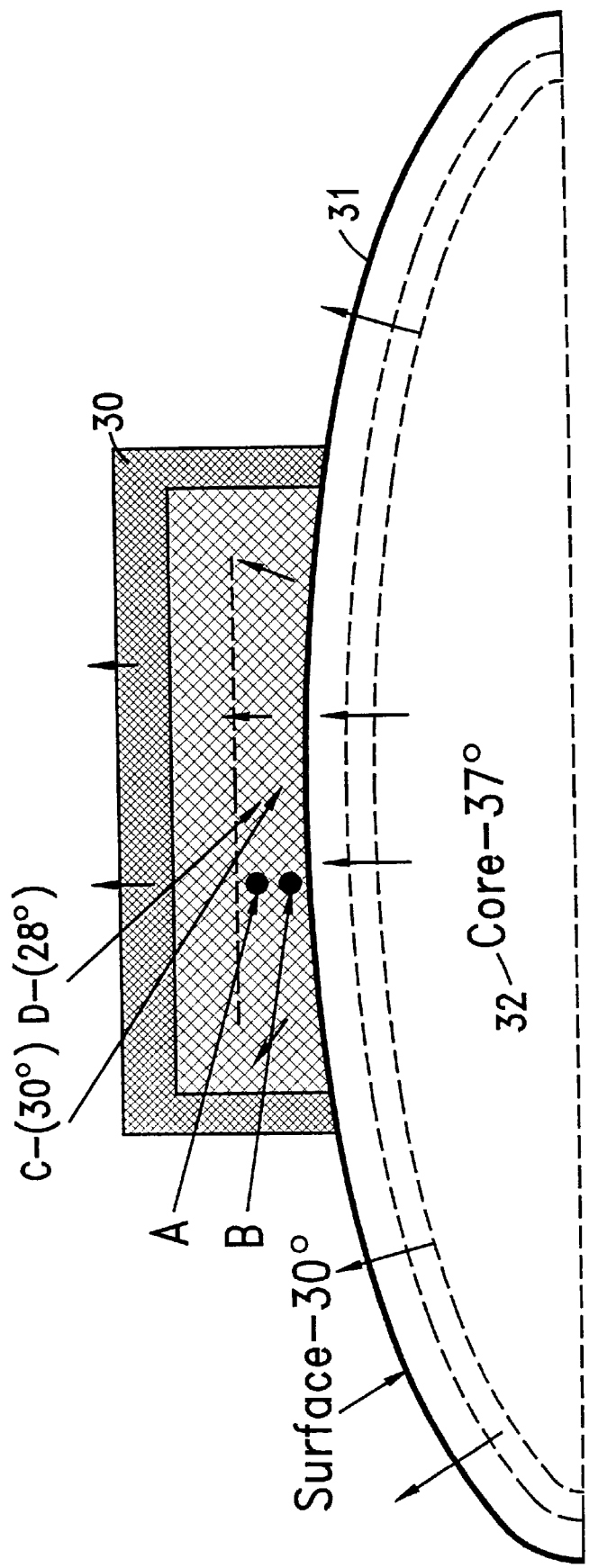
FIG. 3 schematically illustrates the temperature gradients between the body core and the capsule before activating the thermometer.

The temperature gradients in this assembly, before operating the heater, are shown in FIG. 3. After adhesion of the capsule 29 to the surface (the skin, in this case) 27, the system has reached a thermal equilibrium, with a constant heat flow from the core 26 (hot area) to ambient air 33 (cold area) through the sub-surface portion of the body and its surface. In equilibrium, several equi-temperature lines (dotted lines AA, BB in FIG. 2) are formed in said sub-surface portion, where the temperature, that each line represents, decreases upon approaching the surface 27. This indicates an inward positive temperature gradient and consequently an outward flow of heat, shown by a plurality of outgoing arrows (FIG. 3). Therefore, before operating the heater, there is a temperature gradient between the two measurement points "A" and "B", indicating a temperature difference between the surface 27 and core 32 temperatures, which would introduce an error in conventional temperature readings.

Looking back on FIG. 2, before operating the thermometer, the core 26 is at the body temperature normally of 37° C. As a result of heat losses, the surface 27 is at lower temperature, 30° C. The ambient is at normal room temperature of 24° C. According to one preferred embodiment of the invention, the thermometer is operated by connecting the capsule 20 to the CM, via the interface connector 25 and another interface connector carried by the CM and not shown in the drawings. Alternatively, the CM can be integral or permanently connected with the capsule. When said connection has been made, the first and second thermocouple junctions are affected by the temperatures at points "A" and "B", point "B" being in close proximity to the surface 27. The measurement and controller unit of the CM reads the voltage difference generated between the thermocouple junctions (by activating a switch so as to short wires 62 and 63 and measure the voltage difference between wires 61 and 64—see FIGS. 7A and 7B), and, since said difference indicates that the temperature is higher at "B" than at "A", activates the heater 21 by connecting it to the power supply. As a result, there is a heat flow from the heater 21 via the heat conducting material 24 to points "A" and "B" and the body core. This heat flow elevates the temperature at both points, as well at the portion 30 of the surface 27 that is contact with the capsule and the corresponding subsurface areas. Consequently, the flow of heat from core 26 to the inside of the capsule decreases, and the temperature difference between points "A" and "B", that was due to said heat flow, gradually decreases to zero. It is to be noted that the temperature difference caused by the heater 21 between those two points, though they may be at different distances from the heater, is offset by the heat flow from the core. The kinetics of the temperature changes are fast, due to the high thermal conductivity and low thermal capacity of the capsule body 24. The voltage difference between the two thermocouple junctions is also zeroed, indicating zero temperature gradient. At this moment (hereinafter called "the zero moment") the temperature of the portion 30 of the body surface 27 and the temperature at points "A" and "B" within the capsule, equal the body core temperature. The measurement and controller circuit 16, registering the zeroing of the voltage difference, disconnects the wires 62 and 63 (see FIGS. 7A and 7B), i.e., separates between the two thermocouple junctions, and a temperature measurement is taken by one of the junctions, in this case junction $J_1$ which is located at point "B", by connecting it to the reference point CJ (which could be a "cold junction compensation", see FIG. 7B). On condition, as explained hereinbefore, that a thermal equilibrium has been reached, the temperature of point B is the same as that of the portion 30 of the body surface and this latter is the same as that of body core. Thus the measurement represents the desired body core temperature with high accuracy and said temperature is displayed on the temperature display at the CM, while the heater 21 is disconnected from the power supply.

Figure 4:
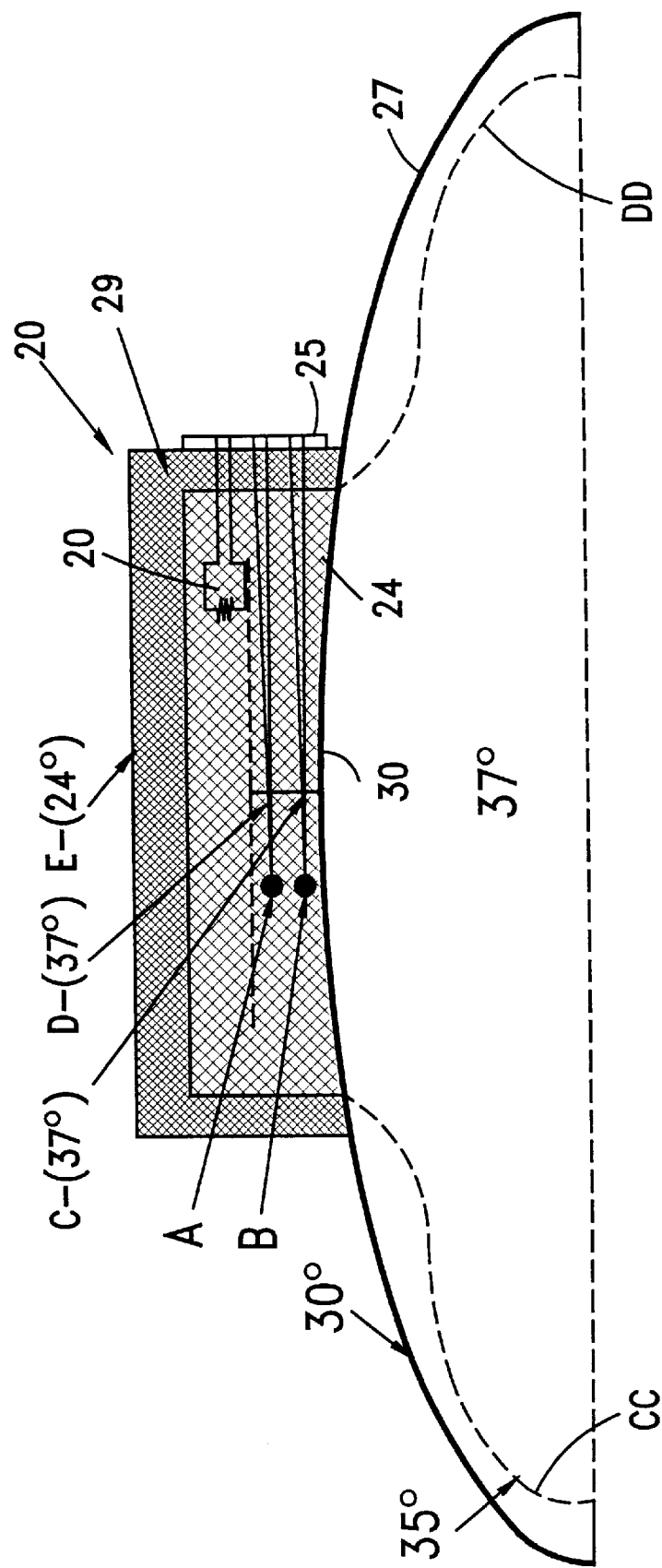
FIG. 4 schematically illustrates the temperature distribution between the body core and the capsule at the time of measurement, according to one preferred embodiment of the invention.

FIG. 4 illustrates the temperature distribution between the body core and the capsule at the zero moment, according to a preferred embodiment of the invention. The temperature at any point within the core of the capsule, constituted by heat conductor 24, and in particular at the portion 30 of body surface 27, is equal to the temperature of the body core, the temperature gradient, along any line going from the body core to the capsule core through said surface portion is zero, and the temperature at any point on such line is that of the body core, 37° C. in this example. Far from the capsule, each equi-temperature line pattern is similar to the pattern before operating the thermometer, as shown in FIGS. 2 and 3 above, viz. essentially parallel to the surface 27. When approaching the surface portion 30, and therefore the capsule, each equi-temperature line bends outward and terminates at the borders of the capsule core, wherein the temperature has been raised by the heat of the controlled heater to coincide with the temperature of the body core. An example of a 35° C. equi-temperature line pattern, curved toward outwardly to form curve segments CC–DD, is shown.

In one preferred embodiment of the invention it is desired to reduce the measurement time, without substantial degradation of measurement accuracy, by an extrapolation. This will be understood by reference to FIGS. 5A and 5B. FIG. 5A shows how the voltage difference between the two junctions $J_1$ and $J_2$, indicated as "I", varies with time. It is $I_0$ up to the moment $t_0$ where the thermometer is activated, i.e., the time when the heater starts heating. From that moment on, it decreases for example linearly up to a time $t_2$, when it becomes zero, and when, ordinarily, the temperature of the thermocouples would be read. If that reading is carried out at a time $t_1 < t_2$, the time $t_2$ can be estimated from the function describing the change in the temperature difference during the time $t_1 - t_0$.

FIG. 5B schematically illustrates the change in the temperature of the body surface Ts as a function of time. The initial surface temperature is $Ts_0$. The surface temperature gradually rises until the zero time $t_2$ where the surface temperature of the body is equal to its core temperature, indicated in FIG. 5B by Tc. At time t1 the surface temperature is $Ts_1$, lower than Tc but higher than $Ts_0$. If $Ts_0$ and $Ts_1$ are measured, and $t_2$ has been calculated by extrapolation, Tc, which would be the value of Ts at time $t_2$, can also be calculated by extrapolation. The controller can easily be programmed to carry out the calculations.

The measurement accuracy is slightly affected by this extrapolation and by the fact that the assumption on which it is based may not be fully accurate. According to one preferred embodiment of the invention, high accuracy is achieved by carrying out a thorough calibration of the device with a typical human body, prior to actual measurements.

A second measurement may be taken by not disconnecting the heater at the zero moment by letting it overheat and then disconnecting it and taking a measurement as the system cools towards a new zero moment. In this way, temperature measurements can be taken almost continuously from a sick patient. In this case, the heater output will be modulated rather than connected and disconnected. Additional factors which affect the measurement time and accuracy are the heat conductance and the heat capacity of the capsule. As has been said, high heat conductivity is desired, for quick heat transfer from the heater to the surface and vice versa, and so is low heat capacity. Furthermore, the power of the heater may be reduced for capsules with low heat capacity.

Figure 6:
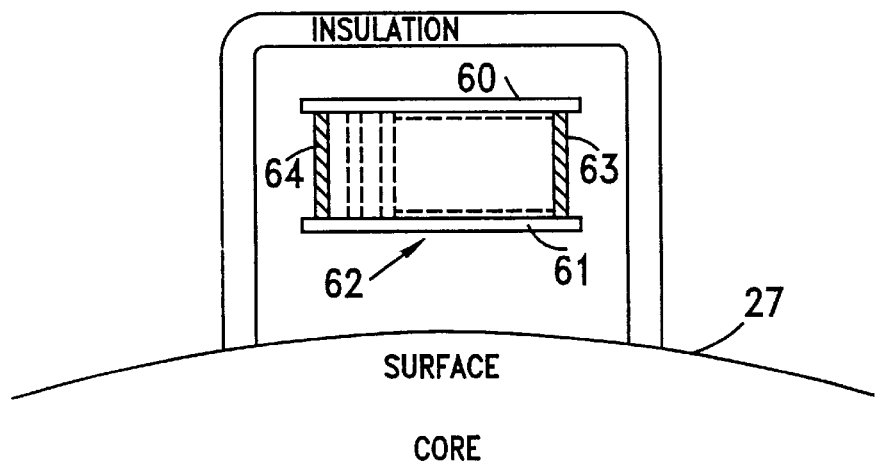
FIG. 6 schematically illustrates the construction of the capsule of the thermometer, according to an embodiment of the invention.

According to one preferred embodiment of the invention the inside of the capsule is constructed specially to achieve high heat conductivity and low heat capacity, as illustrated in FIG. 6. A metallic skeleton is constructed from two metal sheets, 60 and 61, with high heat conductivity and low heat capacity, such as aluminum or copper. Two metal bars, 63 and 64, or a plurality of such bars, connect between metal sheets 60 and 61, forming a high heat conducting path without short circuiting so as to maintain a temperature difference (a short circuit would prevent that). The length and diameter of the bars is adjusted to maintain an appropriate gradient. According to one preferred embodiment of the invention, these metallic connections, as well as the whole skeleton, may be fabricated as a conductive mesh, using etching and/or photochemical techniques, or by masked microelectronics evaporation. The use of a plurality of such thermal short-circuits increases the thermal conductivity of the capsule core, with minor increase in thermal capacity.

According to one preferred embodiment of the invention, the capsule is permanently attached to the skin of each patient for as long as desired to obtain repetitive temperature readings. In this case, a plurality of fast and accurate temperature measurements, from different patients, can be taken by a nurse having one CM. The nurse connects the interface connector of the CM to the mating connector of the capsule attached to a patient, waits a predetermined time (required for accurate extrapolation), records the reading for that patient and moves to the next patient. In this way, substantial time is saved, and the need for sterilization of the thermometer is dispensed with.

According to another preferred embodiment of the invention, the capsule is attached to a diaper (or to a disposable diaper) worn by a patient (baby), in the upper area, having relatively low moisture. In this case the thermal contact of the capsule with the skin may be improved by a heat conducting paste, such as silicon paste, an elastic band, etc.

According to still another preferred embodiment of the invention, a similar method can be applied for sensing the temperature inside an oven from the outside. The measurement time depends upon the inherent insulation of the oven from the ambient. Relatively low levels of insulation results in reduced measurement time.

It will be understood that the above examples and description have been provided only for the purpose of illustrations, and are not intended to limit the invention in any way, and that, the invention can be carried out by skilled persons with many modifications, variations and adaptations, without departing from its spirit or exceeding the scope of the claims.

What is claimed is:

1. A method of measuring the temperature of the core of a body, which comprises:
   a) providing a heat conductive space outside the body and in contact with its surface;
   b) monitoring the difference of the temperatures of two points located within said space and at different distances from said body surface;
   c) if said temperature difference indicates that heat is flowing from the body surface outwards, generating heat in said space, to reduce said temperature difference;
   d) monitoring said temperature difference; and
   e) assuming the temperature of one of said two points, when said temperature difference is zero, as the temperature of said body core.

2. The method according to claim 1, further comprising continuing the generation of heat in said space until the difference of the temperatures of the two points located within said space has become zero, and then measuring the temperature of one of said two points.

3. The method according to claim 1, further comprising discontinuing the generation of heat in said space before the difference of the temperatures of the two points located within said space has become zero, extrapolating the curve expressing the variation of said temperature difference with time to calculate the zero time at which said temperature difference would have become zero, and extrapolating the curve expressing the variation of the temperature of one of said two points to calculate the temperature which it would have assumed at said calculated zero time.

4. The method according to claim 1, further comprising thermally insulating the heat conductive space on all its surfaces, except where it is intended to contact the surface of the body.

5. The method according to claim 1, wherein the body is a human body, and further comprising carrying out a calibration by applying the method to a typical human body.

6. An apparatus for measuring the temperature of the core of a body, which comprises:
   I—a capsule, the inside of which is heat conductive, which has a surface adapted to be placed in contact with the surface of the body the core temperature of which is to be measured, and which is thermally insulated on all its other surfaces;
   II—a heating element for heating the inside of the capsule;
   III—two temperature sensors for measuring the temperatures of two points inside the capsule or the difference of said temperatures;
   IV—a control module, including a power supply; and
   V—a connection between the capsule and the control module.

7. The apparatus according to claim 6, further comprising a temperature display.

8. The apparatus according to claim 6, wherein the temperature sensors are thermocouples.

9. The apparatus according to claim 6, wherein the inside of the capsule comprises a high heat conductivity and a low heat capacity.

10. The apparatus according to claim 8, wherein the control module comprises a power source for activating the heating element, a temperature measurement circuit connected to the thermocouples, a temperature display, and a controller receiving input from the thermocouple junctions and correspondingly controlling the activation of the heater.

11. The apparatus according to claim 10, wherein the temperature measurement circuit operates in two functional modes: measuring the difference of the temperatures of two points inside the capsule, or measuring the temperature of one of said points.

12. The apparatus according to claim 6, wherein the two points are at different distances from the capsule surface adapted to be placed in contact with the surface of the body.

13. The apparatus according to claim 6, wherein the two points are located at or near a perpendicular to the capsule surface adapted to be placed in contact with the surface of the body.

14. The apparatus according to claim 6, for measuring the temperature of a human body.

15. The apparatus according to claim 13, wherein the surface of the capsule that is to be placed in contact with the surface of the body comprises adhesive so that it may be held firmly on the skin.

16. The apparatus according to claim 6, wherein the connection between the capsule and the control module comprises a first interface on the capsule and a second interface on the module and conductors for operatively connecting the interfaces when required.

17. The apparatus according to claim 6, wherein the capsule and control module are permanently connected.

18. The apparatus according to claim 17, wherein the capsule and control module form a unitary structure.

19. The apparatus according to claim 6, wherein the inside of the capsule comprises at least two metal sheets with high heat conductivity and low heat capacity, a filling of a heat conductive material between them, and metal bars connecting said metal sheets to spacer between them filled with air or a thermal insulator.

20. The apparatus according to claim 19, wherein the metal sheets are constructed of a metal selected from the group consisting aluminum and copper.

21. The apparatus according to claim 19, wherein the filling comprises air or a thermal insulator.

22. The apparatus according to claim 6, wherein the inside of the capsule comprises at least one conductive mesh.

23. The apparatus according to claim 6, further comprising a cold compensating junction.

24. The apparatus according to claim 6, further comprising means for attaching the capsule to the skin of a patient for as long as desired to obtain repetitive temperature readings.

* * * * *